(12) United States Patent
Aiba

(10) Patent No.: US 9,350,600 B2
(45) Date of Patent: May 24, 2016

(54) NETWORK RESPONDING METHOD PERFORMED BY AN IMAGE FORMING APPARATUS THAT HAS A NORMAL MODE AND A STANDBY MODE

(71) Applicant: KYOCERA Document Solutions Inc., Osaka (JP)

(72) Inventor: Masaaki Aiba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/583,592

(22) Filed: Dec. 27, 2014

(65) Prior Publication Data
US 2015/0186090 A1    Jul. 2, 2015

(30) Foreign Application Priority Data

Dec. 27, 2013  (JP) ................................. 2013-272653

(51) Int. Cl.
*G06K 15/00* (2006.01)
*H04L 12/24* (2006.01)
*G06F 3/00* (2006.01)
*H04N 1/00* (2006.01)

(52) U.S. Cl.
CPC ........ *H04L 41/0213* (2013.01); *G06K 15/4055* (2013.01)

(58) Field of Classification Search
CPC .......... G06K 15/4055; H04N 1/00893; G06F 1/3293; G06F 1/3287
See application file for complete search history.

(56) References Cited

U.S. PATENT DOCUMENTS

| 8,614,820 | B2 * | 12/2013 | Kamei | .................. G06F 3/1221 358/1.15 |
|---|---|---|---|---|
| 2003/0182367 | A1 * | 9/2003 | Ohara | .................... G06F 3/1204 709/203 |
| 2004/0004732 | A1 * | 1/2004 | Takeda et al. | ................ 358/1.13 |
| 2006/0100724 | A1 * | 5/2006 | Miura et al. | .................... 700/82 |
| 2009/0287855 | A1 * | 11/2009 | Nomura | ......................... 710/19 |
| 2010/0150170 | A1 * | 6/2010 | Lee | ..................... H04L 41/0213 370/466 |
| 2011/0179294 | A1 * | 7/2011 | Hagiuda | ............... G06F 1/3203 713/320 |

FOREIGN PATENT DOCUMENTS

JP    2010-094925 A    4/2010

* cited by examiner

*Primary Examiner* — Marivelisse Santiago Cordero
*Assistant Examiner* — Daryl Jackson
(74) *Attorney, Agent, or Firm* — Hawaii Patent Services; Nathaniel K. Fedde; Kenton N. Fedde

(57) ABSTRACT

Provided is a responding apparatus that performs a network response in the standby mode and is not required much time for transitioning to the standby mode. The responding apparatus receives information request data from a network and transmits response data corresponding to the information request data to network, in the normal mode and standby mode. A normal mode response data making part makes response data in the normal mode. A recursive response request part recursively transmits information request data that requires information of other response data to the normal mode response data making part in the normal mode. An information storing part accumulates the information of the other response data corresponding to the information request data. A standby mode response data making part makes response data from information accumulated by information storing part in the standby mode.

2 Claims, 11 Drawing Sheets

FIG. 3A

| ITEM | DATA |
|---|---|
| Ethernet ADDRESS | 00:C0:EE:AE:AB:C8 |
| IP ADDRESS | 192.168.0.123 |

| OID | TYPE | DATA | |
|---|---|---|---|
| | | DATA VALUE | |
| 1.3.6.1.2.1.2.2.1.1.1 | INTEGER | 1 | |
| 1.3.6.1.2.1.2.2.1.2.1 | STRING | eth0 | |
| 1.3.6.1.2.1.2.2.1.3.1 | INTEGER | 6 | |
| 1.3.6.1.2.1.2.2.1.4.1 | INTEGER | 1500 | |
| 1.3.6.1.2.1.2.2.1.5.1 | Gauge32 | 0 | |
| 1.3.6.1.2.1.2.2.1.6.1 | Hex-STRING | 00 C0 EE AE AB C8 | |
| ... | ... | ... | |

232

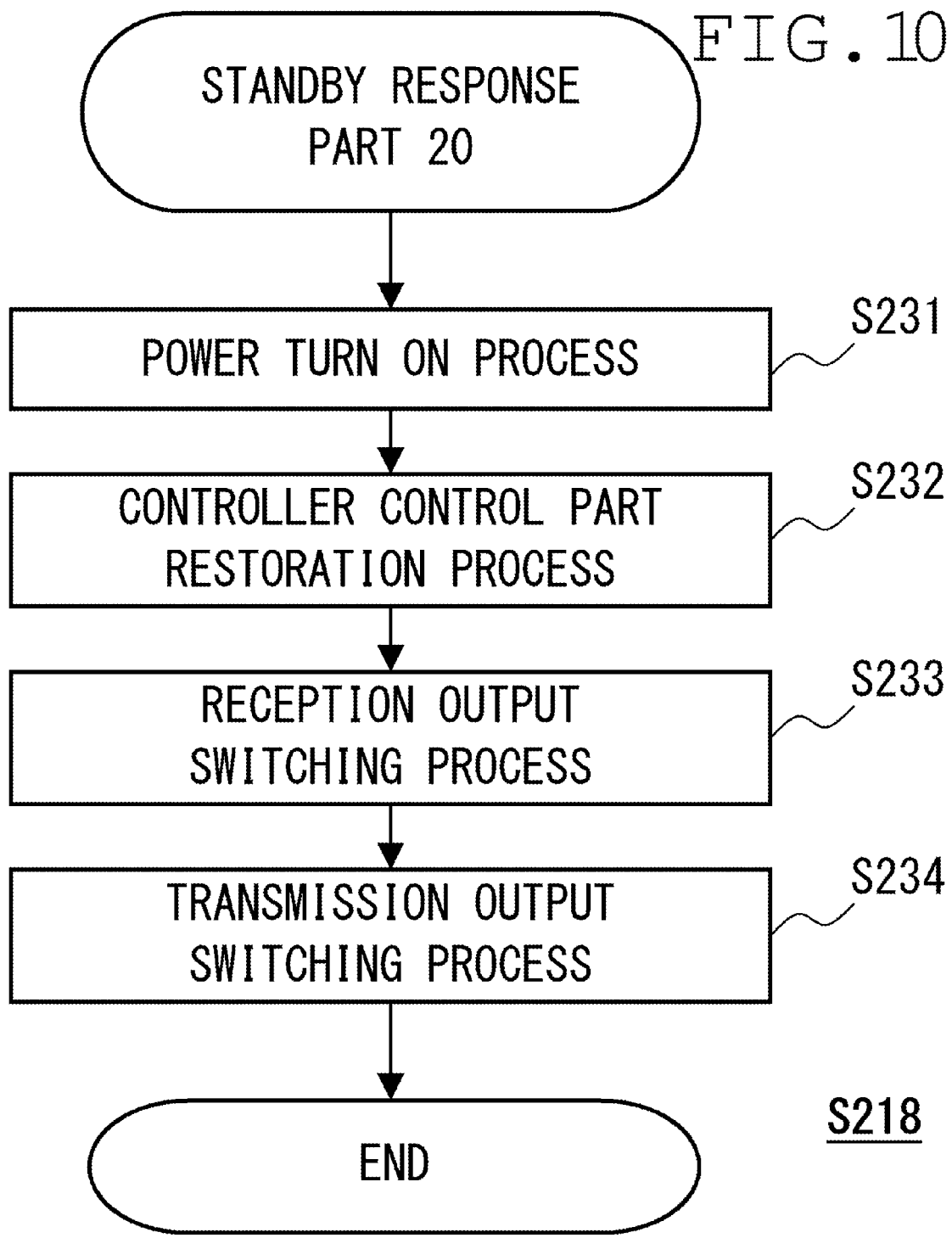

NETWORK RESPONDING METHOD PERFORMED BY AN IMAGE FORMING APPARATUS THAT HAS A NORMAL MODE AND A STANDBY MODE

INCORPORATION BY REFERENCE

This application is based on and claims the benefit of priority from Japanese Patent Application No. 2013-272653 filed on Dec. 27, 2013, the contents of which are hereby incorporated by reference.

BACKGROUND

The present disclosure relates to a responding apparatus and a network responding method. In particular, it is related with a responding apparatus and a network responding method that receives information request data and transmits the response data for the information request data.

As an example of a typical image forming apparatus, there are an MFP (Multifunctional Peripheral) or the like that can print a document and an image.

Some of these image forming apparatuses have ability to be a waiting state of low power where turning off electric power supply to some parts, which has large power consumption, and keeping on the electric power supply only to some parts of functions (henceforth a "standby mode"). This is as energy conservation measures, and it is performed when the time set up previously passes in the state where a user does not use an image forming apparatus. However, once it proceeds to the standby mode, it will need time until a user will be in the state (henceforth "normal mode") where an image forming apparatus can be used.

However, once it proceeds to the standby mode, it will need time until being the state where a user can use the image forming apparatus (henceforth "normal mode").

An example is considered that a host computer transmits information request data, which is data for verifying the information on an image forming apparatus, to the image forming apparatus of standby mode via a network.
In this case, the image forming apparatus replies response data after proceeding to the normal mode from the standby mode, and thus it requires time. Therefore, when information request data are transmitted from the host computer repeatedly, the number of times of proceeding to the normal mode from the standby mode will be increased. Further, since time of being standby mode will be short, power consumption cannot be reduced efficiently.

An example of a typical image forming apparatus that performs this measure is described. The image forming apparatus provides a controller consisting of two CPUs, main CPU (Central Processing Unit) that responds in the normal mode, and sub-CPU that responds in the standby mode. As for this image forming apparatus, in the normal mode, main CPU memorizes response data to RAM (Random Access Memory) in main CPU. In this image forming apparatus, in time of proceeding to the standby mode, sub-CPU extracts frequently-used response data from RAM in main CPU and memorizes it to RAM in sub CPU. In this way, when it proceeds to the standby mode from the normal mode, frequently-used response data is memorized in RAM of sub-CPU. Therefore, in the standby mode, sub-CPU uses the data where sub CPU has been memorized in RAM in sub-CPU and can make response data for transmitting.

SUMMARY

A responding apparatus of the present disclosure includes a communication interface part, a normal mode response data making part, a recursive response request part, an information storing part, and a standby mode response data making part.

The communication interface part receives information request data from a network and transmits response data for the information request data to the network, in the normal mode and in the standby mode.

The normal mode response data making part makes the response data in the normal mode.

The recursive response request part recursively transmits information request data for requiring information of other response data to the normal mode response data making part in the normal mode.

The information storing part accumulates the information of the other response data made by the normal mode response data making part corresponding to the information request data recursively transmitted by the recursive response request part in the normal mode.

The standby mode response data making part makes the response data in the standby mode from information accumulated by the information storing part.

A network responding method of the present disclosure includes receiving information request data from a network in the normal mode and in the standby mode.

The method includes transmitting response data for the information request data to the network in the normal mode and in the standby mode.

The method includes making the response data is made in the normal mode.

The method includes transmitting recursively the information request data that requires information of other response data in the normal mode.

The method includes accumulating the information of the other response data corresponded to the information request data recursively transmitted in the normal mode.

The method includes making the response data in the standby mode from accumulated information.

BRIEF DESCRIPTION OF THE DRAWINGS

FIG. 3A is a tabular diagram illustrating the address information of the responding apparatus.

FIG. 3B is a tabular diagram illustrating of SNMP response information.

FIG. 10 is a flow chart of normal mode transition process in FIG. 8.

DETAILED DESCRIPTION

[Configuration of Responding System X]

Figure 1:
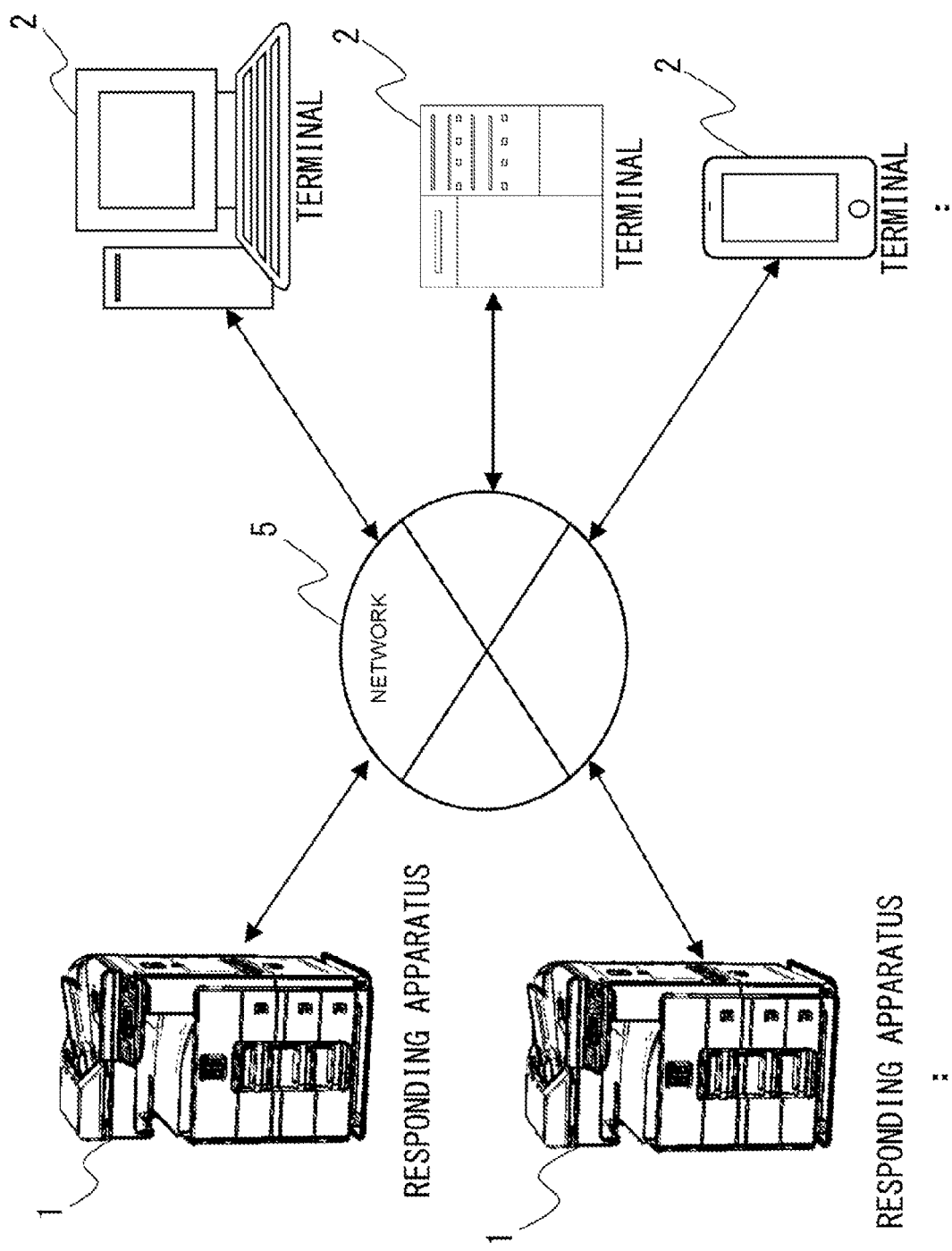
FIG. 1 is a schematic diagram illustrating a block configuration of a responding system in the present disclosure.

Firstly, as refer to FIG. 1, components of responding system X related to the embodiment in the present disclosure are described. Responding system X has responding apparatus 1 and terminal 2(s). Responding apparatus 1 and terminal 2 are connected in network 5.

Responding apparatus 1 may receive information request data 131 via network 5 and transmit response data 132 for information request data 131.

Responding apparatus 1 may be an image forming apparatus.

In the present embodiment, responding apparatus 1 may have function of SNMP (Simple Network Management Protocol) agent.

Terminal 2 may transmit information request data 131 to responding apparatus 1 and receive response data 132 for information request data 131.

Terminal 2 may have function of SNMP manager. Network 5 is an external network.

Network 5 may transmit and receive TCP/IP packets, for example.

[Control Configuration of Responding Apparatus 1]

Figure 2:
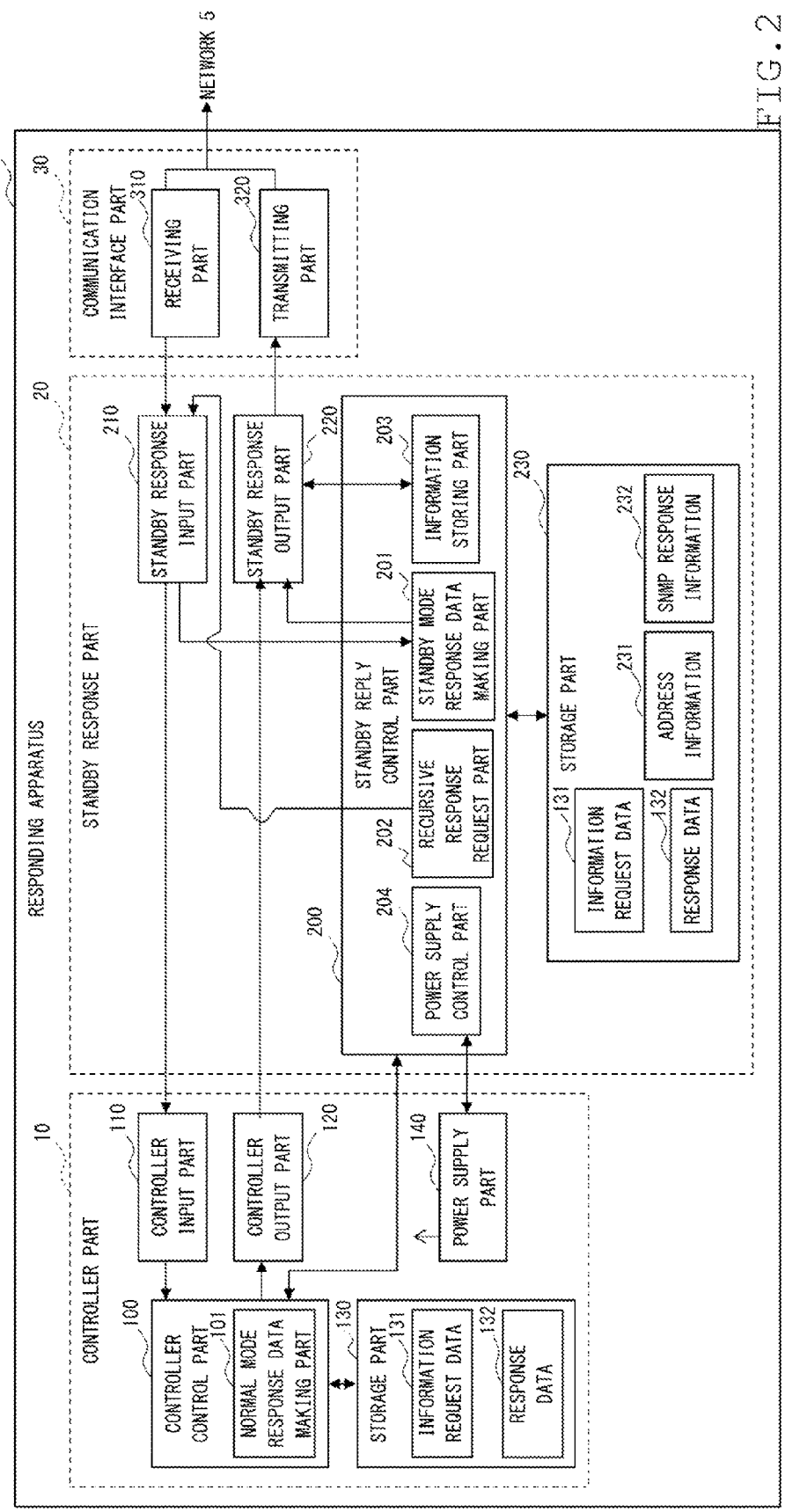
FIG. 2 is a schematic diagram illustrating a block configuration of a responding apparatus of an image forming apparatus in the present disclosure.

Then, as refer to FIG. 2, control components of responding apparatus 1 are described.

Responding apparatus 1 related to the embodiment in the present disclosure includes controller part 10, standby response part 20, and communication interface part 30. Each part is connected to network 5 via communication interface part 30.

(Configuration of Controller Part 10)

Controller part 10 includes function of a host controller.

Controller part 10 includes a main board that controls each part of an image forming apparatus or the like, and a network card, or the like. Controller part 10 has controller control part 100, controller input part 110, controller output part 120, storage part 130, and power supply part 140.

Controller part 10 inputs information request data 131 and outputs response data 132 when responding apparatus 1 is normal mode. Therefore, in controller part 10, controller control part 100 processes the receive packet received by controller input part 110 and transmits a response packet to controller output part 120.

Controller control part 100 is an information processing part. Controller control part 100 includes normal mode response data making part 101. The details of normal mode response data making part 101 are described later.

Controller control part 100 reads the control program memorized in storage part 130. Controller control part 100 is performed by developing the control program and is operated as each means of a functional block as described later. Thereby, controller control part 100 is possible to perform function as an SNMP Agent, for example. Also, controller control part 100 controls whole devices of the image forming apparatus or the like, according to specified instructions information. The specified instructions information is inputted from the external terminal or operation panel part, which are not illustrated.

Controller input part 110 outputs the packet received from standby response part 20 to controller control part 100. In other words, controller control part 100 inputs information request data 131 outputted from standby response part 20 via controller input part 110.

In more detail, controller input part 110 inputs information request data 131 that has been inputted from receiving part 310 of communication interface part 30 and has been outputted from standby response part 20. In addition to this, controller input part 110 also inputs information request data 131 that has been recursively transmitted by recursive response request part 202, which is described later, and has been outputted from standby response part 20.

Controller output part 120 outputs the packet made by controller control part 100 to standby response part 20. In other words, controller output part 120 outputs response data 132 to standby response part 20.

Storage part 130 is a memory part including non-transitory recording medium.

Storage part 130 memorizes information request data 131 and response data 132. In storage part 130, a memory content may be kept in a state of standby mode. Also, a control program for performing operation of responding apparatus 1 is memorized in storage part 130. In addition, storage part 130 may also memorize a setup of user account. Also, area of the storage folder for every user may be included in storage part 130.

Further, at the time of standby mode, read and write from standby response part 20 will not be available in storage part 130.

Power supply part 140 is a circuit of power supply for each part including controller control part 100 in controller part 10. Power supply part 140 controls the power supply of controller control part 100 in response to the input from power supply standby reply control part 200 in standby response part 20. Power supply part 140 supplies electric power to each part when a power supply is turned on by the control from standby response part 20. Also, Power supply part 140 turns off electric power to each part when the power supply is turned off.

Normal mode response data making part 101 makes response data 132 at the time of normal mode. When information request data 131 is acquired from controller input part 110, normal mode response data making part 101 temporarily stores it in storage part 130.

Normal mode response data making part 101 refers to the information request data 131, in case that a response is required, makes response data 132, and outputs to controller output part 120. Also, in case of a condition previously set in storage part 130, normal mode response data making part 101 makes to proceed from the normal mode to the standby mode. As the condition set up previously, for an example, a condition is enumerated that the time set up by the timer, which is not illustrated, has been passes since not detecting a user instruction. The condition not detecting the user instruction can be set up, for example, a condition in case that print data or the like is not received but the set up time passes after the user touched the operation panel lastly.

Here, controller control part 100 of responding apparatus 1 is executing the control program memorized in storage part 130 and functions as normal mode response data making part 101.

Information request data 131 is data for requiring variety of information for responding apparatus 1 by various protocols. Information request data 131 is acquired from controller input part 110 and is temporarily memorized in the normal mode response data making part 101.

Information request data 131 may be data of various requests in various protocols or the like, for example. Information request data 131 may include data or the like in various requests including OID (Object Identifier,) for example.

Response data 132 is data for performing a response according to various protocols for information request data 131. Response data 132 is made by normal mode response data making part 101 and is outputted to controller output part 120.

If information request data 131 is an ARP request or an RARP request, response data 132 may be IP address and MAC Address for responding apparatus 1, for example.

Also, for example, if information request data 131 is the various requests of SNMP, response data 132 may include response message data, such as "SNMP-Get response", "TRAP", or the like. The response message data may be made by referring OID about MIB (Management Information Base) in responding apparatus 1.

(Configuration of Standby Response Part 20)

Standby response part 20 performs a standby response to network 5, when responding apparatus 1 is standby mode. Standby response part 20 has standby reply control part 200, standby response input part 210, standby response output part 220, and storage part 230. Each part is connected by various bus.

At the time of standby mode, standby response part 20 inputs information request data 131 from communication interface part 30 and outputs response data 132 to communication interface part 30.

Standby reply control part 200 is an information processing part. Also, standby reply control part 200 includes standby mode response data making part 201, recursive response request part 202, information storing part 203, and power supply control part 204. The details of each part are described later.

Standby reply control part 200 is connected to standby response input part 210, standby response output part 220, and storage part 230, and it controls each part. Also, standby reply control part 200 may has lower power consumption as compared with controller control part 100 in controller part 10.

Standby response input part 210 outputs the packet inputted from communication interface part 30 or recursive response request part 202 to controller part 10 or standby mode response data making part 201 in standby reply control part 200. Also, standby response input part 210 inputs information request data 131 outputted from communication interface part 30.

Standby response output part 220 outputs the packet inputted from controller part 10 or standby mode response data making part 201 in standby reply control part 200 to information storing part 203 or communication interface part 30. Standby response output part 220 outputs response data 132 to communication interface part 30 and information storing part 203 in standby reply control part 200.

Storage part 230 includes non-transitory recording medium. The storage capacity of storage part 230 may be less than storage part 130 in controller part 10.

In addition, storage part 230 may be contained in standby reply control part 200. The recording medium contained in standby reply control part 200 may memorize only program and data, which standby reply control part 200 performs.

Standby mode response data making part 201 makes response data 132, when responding apparatus 1 is in the standby mode, from information of SNMP response information 232, or the like, which is accumulated in storage part 230 by information storing part 203.

Standby mode response data making part 201 makes a response of a packet inputted from standby response input part 210 by using data in storage part 230.

Specifically, for example, standby mode response data making part 201 makes response data 132 for received ARP request or RARP request from address information 231 in storage part 230. Also, for example, standby mode response data making part 201 makes response data 132 for the received SNMP-GET request from SNMP response information 232.

In addition, standby mode response data making part 201 restores controller part 10, in case that the storage capacities of storage part 230 is insufficient and cannot make response data 132. In this case, standby mode response data making part 201 makes a return instruction notify to power supply part 140 from power supply control part 204.

Recursive response request part 202 is a request preparing part that transmits recursively information request data 131, which requires information of other response data 132, to the normal mode response data making part 101 at the time of normal mode.

Recursive response request part 202 requires the information of other response data 132, in case that response data 132, which includes previously-defined specific kind of information, is made by normal mode response data making part 101 as corresponded to information request data 131 from outside.

Specifically, recursive response request part 202 detects an IP address and a MAC Address are memorized in address information 231 by information storing part 203. Then, recursive response request part 202 make transmits SNMP MIS data recursively from controller part 10. Therefore, for example, recursive response request part 202 acquires the IP address and the MAC Address from storage part 230 and generates a packet of SNMP-GetNext request, and it inputs the packet into standby response input part 210.

Information storing part 203 accumulates information of response data 132 outputted from controller part 10 to communication interface part 30 via standby response output part 220. Also, information storing part 203 accumulates information of response data 132 made by normal mode response data making part 101 as corresponded to information request data 131 recursively transmitted by recursive response request part 202 at the time of normal mode. Therefore, information storing part 203 acquires and analyzes the packet outputted from standby response output part 220. Then, information storing part 203 memorizes necessary information in storage part 230.

Specifically, when a packet of ARP or RARP is inputted, information storing part 203 set up and memorize the IP address and the MAC Address to address information 231. Similarly, when an SNMP response packet is inputted, information storing part 203 memorizes OID and response data 132 to SNMP response information 232. Thereby, information storing part 203 can store at least a part of MIB of SNMP for responding apparatus 1 in SNMP response information 232. In addition, when a specific kind of information is acquired, information storing part 203 may notify that effect to recursive response request part 202. For example, when the ARP and the RARP packet are inputted and the IP address and the MAC Address are memorized in address information 231 for the first time, information storing part 203 notifies that effect to recursive response request part 202 of standby reply control part 200 (this notice is hereafter called "notice of address memory".).

Power supply control part 204 controls power supply part 140 of controller part 10 for turning ON or OFF.

When standby mode transition command from controller part 10 is received, power supply control part 204 turns OFF power supply part 140 of controller part 10 and makes start process in the standby mode by standby response part 20.

Also, when instruction, which makes transition to the normal mode by standby mode response data making part 201, is received, power supply control part 204 turn ON power supply part 140. Thereby, power supply control part 204 restores the power supply of controller part 10 via power supply part 140 and makes start process in the normal mode.

In addition, standby reply control part 200 of responding apparatus 1 executes control program memorized in storage part 230 and functions as standby mode response data making part 201, recursive response request part 202, information storing part 203, and power supply control part 204.

Storage part 230 memorizes information request data 131, address information 231, and SNMP response information 232. The configuration of address information 231 and SNMP response information 232 are described later.

In addition, as for SNMP response information 232, information does not need to be set up at the time of boot for responding apparatus 1.

(Configuration of Communication Interface Part 30)

Communication interface part 30 is an interface of physical layer that converts a logic signal into an actual electric signal in a network interface. Since it connects as corresponded to network 5, communication interface part 30 may be detachable.

Communication interface part 30 includes receiving part 310 and transmitting part 320.

Receiving part 310 outputs specific unit of data received from network 5 (hereafter, it is just called a "packet") to standby response part 20. In other words, when receiving part 310 receives the packet of information request data 131 transmitted from terminal 2, it outputs the information request data 131 to standby response part 20.

Transmitting part 320 transmits the packet outputted from standby response part 20 to network 5.

Specifically, transmitting part 320 transmits the packet of response data 132 to terminal 2, when response data 132 is inputted from standby response part 20.

Here, each part of above-mentioned responding apparatus 1 serves as hardware resources that perform the network responding method in the present disclosure.

(Detailed Configuration of Address Information 231 and SNMP Response Information 232)

Then, as refer to FIG. 3, the configuration of address information 231 and SNMP response information 232, which are memorized in storage part 230 of standby response part 20, are described.

Firstly, configuration of address information 231 as shown in FIG. 3A is explained. Address information 231 is a table that memorizes the IP address and the MAC Address of responding apparatus 1.

As explained in detail, address information 231 is has items of "IP address" and "MAC Address (Ethernet address)."

In "IP address," the IP address of responding apparatus 1 set in response data 132 is acquired and stored by information storing part 203.

In "MAC Address," the MAC Address corresponding to the IP address of responding apparatus 1 set in response data 132 is acquired and stored by information storing part 203.

Then, configuration of SNMP response information 232 as shown in FIG. 3B is explained. SNMP response information 232 is a table storing MIB or the like, which is used for response data 132 of SNMP for controller part 10, and OID and response data 132 are memorized.

In SNMP response information 232, information of response data 132 for information request data 131 of SNMP is accumulated. SNMP response information 232 has items of "OID" and "data." In "OID", an identifier, or the like, which is attached in order to distinguish an object of each management information stored in MIB (Management Information Base) for SNMP, is stored. In "data", data for "OID" set in response data 132, or the like, is stored. Also, "data" has items of "type" and "data value."

In "type," a type of the "data value", or the like, is stored. For example, if the type of the "data" is an integer, value of "INTEGER" is stored; also, if the type is a character string, value of "STRING" is stored; and the like. In "data value," an actual data value or the like is stored. Further, SNMP response information 232 may be memorized as tree type data structure.

[Normal Mode Process by Responding Apparatus 1]

Figure 4:
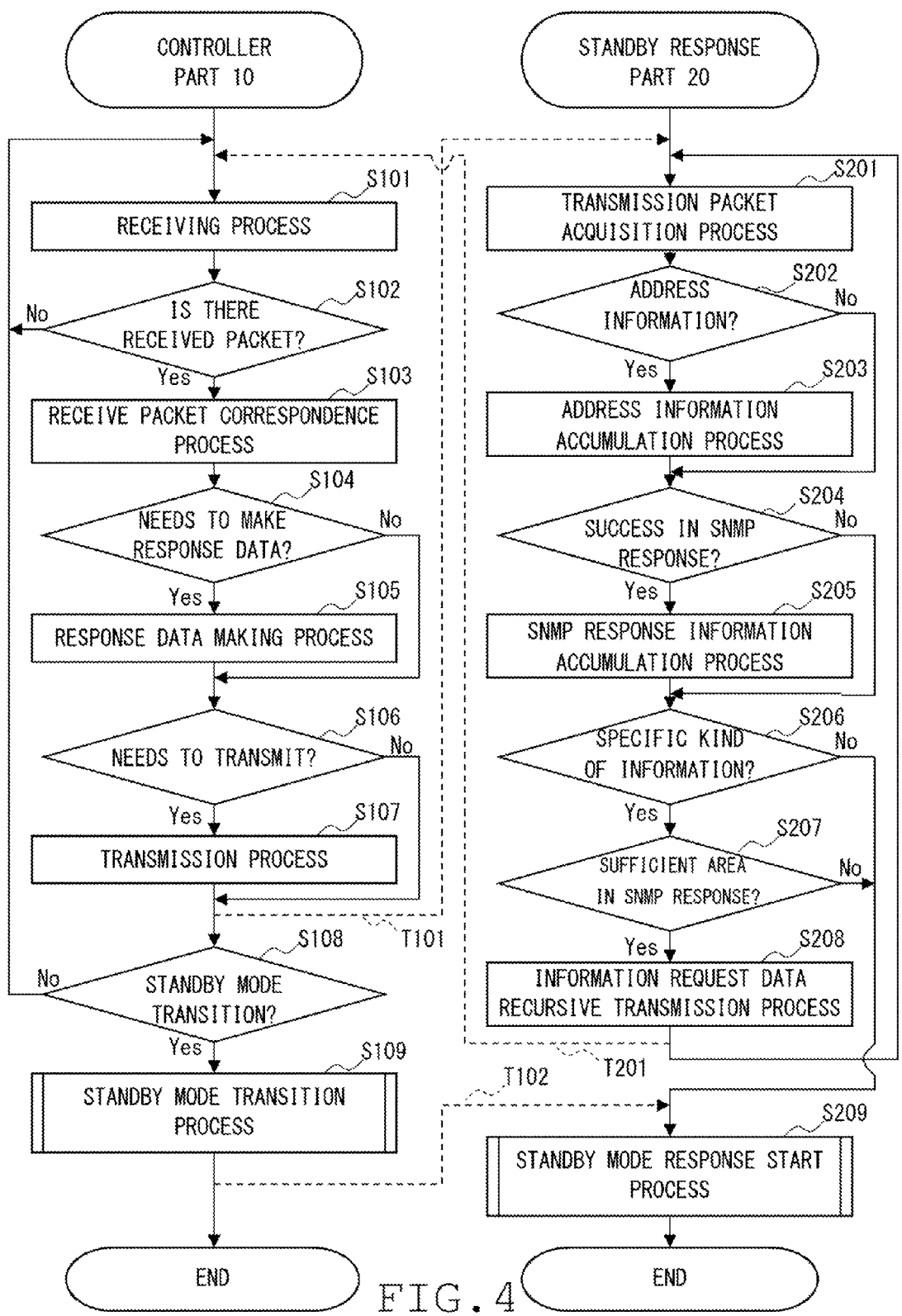
FIG. 4 is a flow chart of normal mode process of the responding apparatus.
Figure 5:
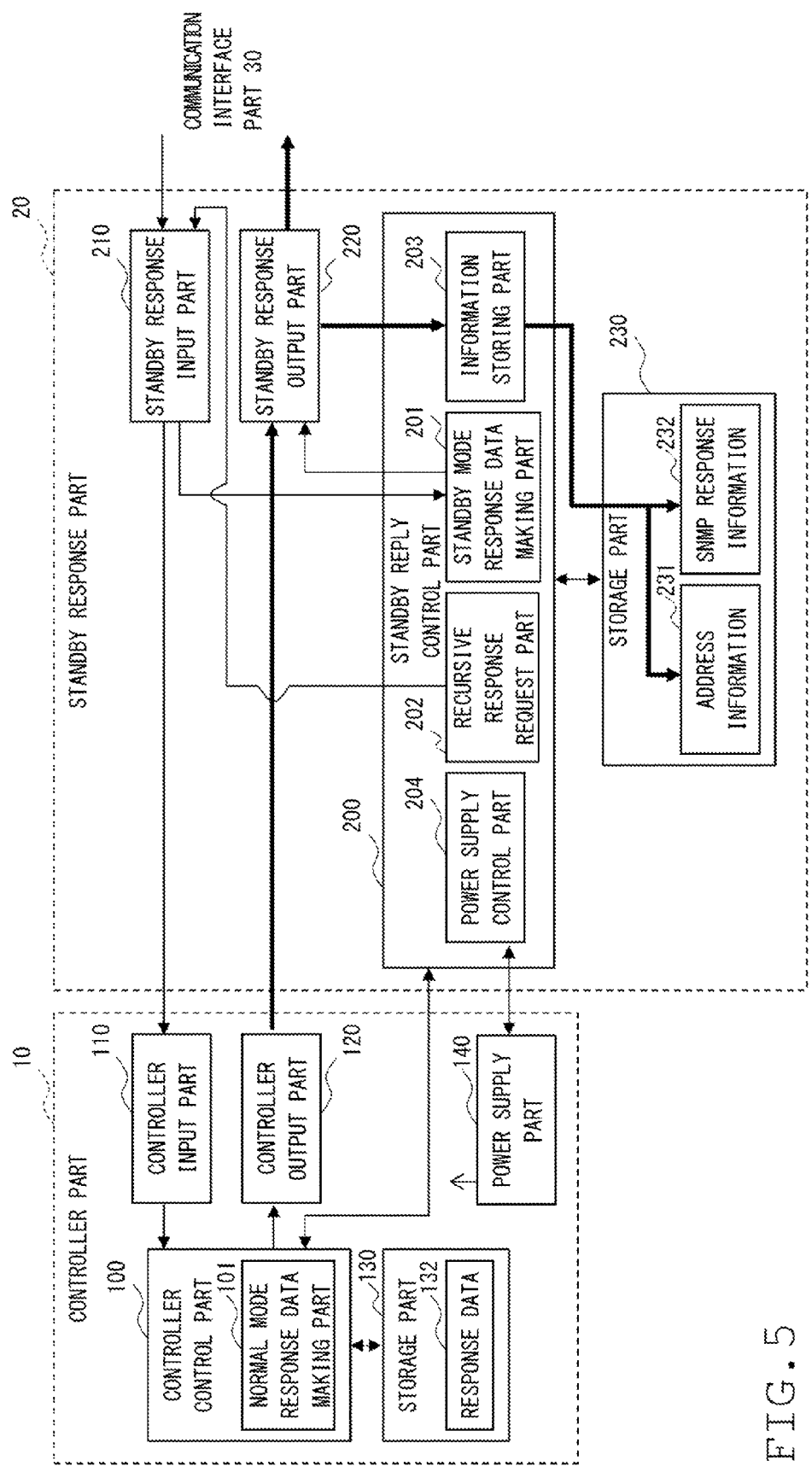
FIG. 5 is a schematic diagram of address information accumulation process and SNMP response information accumulation process in FIG. 4.
Figure 6:
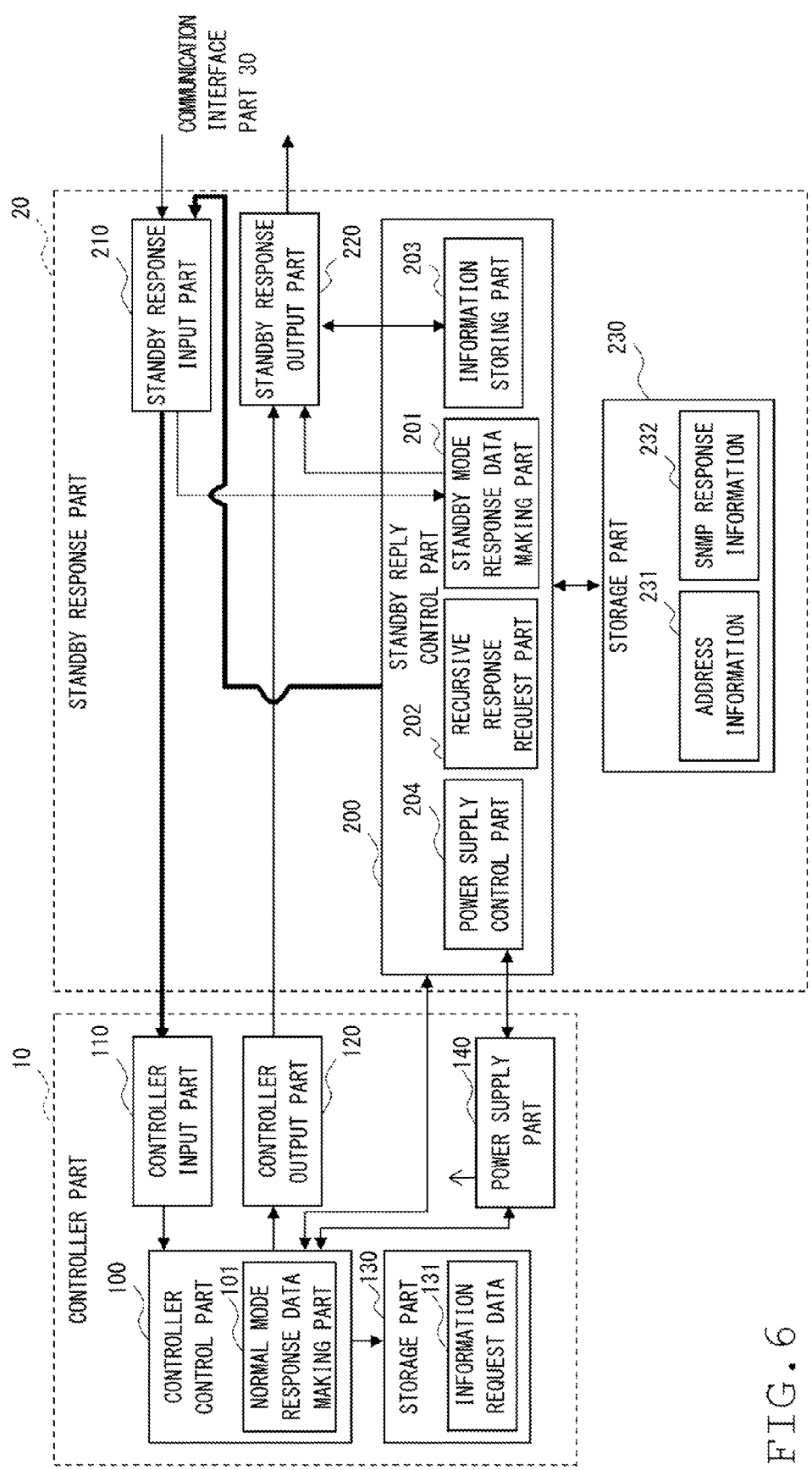
FIG. 6 is a schematic diagram of the information request data recursive transmission process in FIG. 4.

Then, as refer to FIG. 4-FIG. 6, normal mode process that is operation at the time of normal mode by responding apparatus 1 related to the embodiment in the present disclosure is explained.

In the normal mode process of the present embodiment, at the time of normal mode, controller part 10 makes response data 132 and responds to information request data 131. In this case, standby response part 20 acquires transmitted packet, extracts information required for the response at the time of standby mode, and memorizes it in storage part 230. Specifically, when response data 132 including an IP address and a MAC Address or response data 132 including MIB of SNMP is transmitted by controller part 10, standby response part 20 acquires it. At first, standby response part 20 acquires response data 132 including the IP address and the MAC Address. Then, standby response part 20 recursively transmits a SNMP-GetNext request to controller part 10. Thereby, standby response data 132 of SNMP is accumulated.

In the normal mode process in the present embodiment, in controller part 10, controller control part 100 mainly reads the program memorized in storage part 130. Also, in standby response part 20, standby reply control part 200 executes the program memorized in storage part 230. Further, each part collaborates and performs by using hardware resources.

In the following, as refer to the flow chart in FIG. 4, the details of normal mode process are explained for every step.

(Step S101)

Firstly, controller input part 110 performs receiving process.

Here, a packet from network 5 is received firstly in receiving part 310 of communication interface part 30. In this case, the packet is inputted into standby response input part 210 of standby response part 20.

Also, a packet recursively transmitted from recursive response request part 202 of standby reply control part 200 is also inputted into standby response input part 210. Then, the packet inputted into standby response input part 210 of communication interface part 30 is further inputted into controller input part 110 of controller part 10.

Controller input part 110 outputs the inputted packet to controller control part 100.

(Step S102)

Then, controller control part 100 as normal mode response data making part 101 determines whether or not there is a received packet or a packet of a recursive response. Controller control part 100 determines "Yes" if the packet received in receiving part 310 or the packet recursively transmitted from recursive response request part 202 is inputted. Otherwise, controller control part 100 determines "No."

In Yes, controller control part 100 advances a process to Step S103.

In No, controller control part 100 returns a process to Step S101, and it standby until receiving a packet.

(Step S103)

If there is the packet of the reception or the recursive response, controller control part 100 as normal mode response data making part 101 performs receive packet correspondence process.

Controller control part 100 processes the packet inputted into controller input part 110. Controller control part 100 performs a required process, if the inputted packet is a packet required for various control of responding apparatus 1, which includes image formation. Controller control part 100 performs this process according to various protocols corresponding to the acquired packet.

Also, if the inputted packet is information request data 131, controller control part 100 stores it temporarily in storage part 130.

(Step S104)

Then, controller control part 100 as normal mode response data making part 101 determines whether or not needs to make response data 132. Controller control part 100 determines "Yes" if the received packet is information request data 131 and response data 132 is needed to make. Also, controller control part 100 determines "Yes" if the packet is a recursive response and it is needed to make response data 132. Otherwise, controller control part 100 determines "No."

In Yes, controller control part 100 advances a process to Step S105.

In No, controller control part 100 advances a process to Step S106.

(Step S105)

If response data 132 is needed to make, controller control part 100 as normal mode response data making part 101 performs response data making process.

Controller control part 100 makes response data 132 as corresponded to information request data 131 stored temporarily.

(Step S106)

Here, controller control part 100 as normal mode response data making part 101 determines whether or not there is any packet to transmit. Controller control part 100 determines "Yes," if response data 132 is made. Also, controller control part 100 determines "Yes," if a required process is performed for a packet needed for various control of responding apparatus 1 and the packet to transmit as corresponded to various protocols is made. Otherwise, controller control part 100 determines "No."

In Yes, controller control part 100 advances a process to Step S107.

In No, controller control part 100 advances a process to Step S108.

(Step S107)

If there is a packet need to transmit, controller control part 100 as normal mode response data making part 101 performs a transmission process.

Controller control part 100 makes the packet to transmit output from controller output part 120.

Specifically, controller output part 120 outputs the packet to transmit to standby response output part 220 of standby response part 20.

The packet to transmit is outputted to transmitting part 320 of communication interface part 30 by standby response output part 220.

The packet to transmit is outputted to network 5 by transmitting part 320.

Also, the packet to transmits is outputted also to information storing part 203 of standby reply control part 200 of standby response part 20 from standby response output part 220 (timing T101).

(Step S201)

Here, after transmitting response data 132, standby reply control part 200 of standby response part 20 as information storing part 203 performs transmission packet acquisition process.

Standby reply control part 200 acquires and analyzes the packet that transmits from standby response output part 220.

(Step S202)

Then, standby reply control part 200 as information storing part 203 determines whether or not the acquired packet is address information. Standby reply control part 200 determines "Yes," if the acquired packet is the packet of response data 132, such as ARP and RARP. Otherwise, standby reply control part 200 determines "No."

In Yes, standby reply control part 200 advances a process to Step S203.

In No, standby reply control part 200 advances a process to Step S204.

(Step S203)

If the packet of response data 132, such as ARP and RARP, standby reply control part 200 as information storing part 203 performs address information accumulation process.

As refer to FIG. 5, standby reply control part 200 memorizes an IP address and a MAC Address of the transmission origin for the packet in address information 231 in storage part 230. That is, the IP address and the MAC Address of responding apparatus 1 are stored in address information 231. In this case, standby reply control part 200 notifies the notice of address memory to recursive response request part 202.

(Step S204)

Here, standby reply control part 200 as information storing part 203 determines whether or not the acquired packet is a response of SNMP and the response is successful. Standby reply control part 200 determines "Yes," in case that the acquired packet is response data 132 of a SNMP-Get response or the response of TRAP and is normal status or the like. Otherwise, standby reply control part 200 determines "No."

In Yes, standby reply control part 200 advances a process to Step S205.

In No, standby reply control part 200 advances a process to Step S206.

(Step S205)

If it is succeeded in the response of SNMP, standby reply control part 200 as information storing part 203 performs SNMP response information accumulation process.

According to FIG. 5, standby reply control part 200 memorizes OM and response data 132 in the acquired packet in SNMP response information 232.

(Step S206)

Here, standby reply control part 200 as recursive response request part 202 determines whether or not the acquired packet has previously-defined specific kind of information. Standby reply control part 200 determines "Yes," if, for example, as the previously defined specific kind of information, the IP address and the MAC Address of transmission-origin in response data 132 are memorized in address information 231 in storage part 230 and the notice of address memory is received from information storing part 203. Otherwise, standby reply control part 200 determines "No."

In Yes, standby reply control part 200 advances a process to Step S207.

In No, standby reply control part 200 advances a process to Step S209.

(Step S207)

If the acquired packet is the specific kind of information, standby reply control part 200 as recursive response request part 202 determines whether or not there is sufficient area to memorize SNMP response information 232 in storage part 230. Standby reply control part 200 determines "Yes," if there is sufficient area in the table of SNMP response information 232. Standby reply control part 200 determines "No," if there is insufficient area in the table of SNMP response information 232.

In Yes, standby reply control part 200 advances a process to Step S208.

In No, standby reply control part 200 advances a process to Step S209.

(Step S208)

If there is sufficient area in the table of SNMP response information 232, standby reply control part 200 as recursive response request part 202 performs information request data recursive transmission process. As refer to FIG. 6, standby reply control part 200 makes a packet of a SNMP-GetNext request, and it makes input into standby response input part 210. Standby reply control part 200 can has first-time OID as "root" in this case (timing T201).

Then, standby reply control part 200 returns a process to Step S201.

Henceforth, standby reply control part 200 uses OID of SNMP response acquired just before and transmits a GetNext request.

(Step S108)

Once more, process of controller part 10 is explained.

Here, controller control part 100 of controller part 10 as normal mode response data making part 101 determines whether or not proceeding to the standby mode. Controller control part 100 determines "Yes," if it becomes the conditions set up previously. Otherwise, controller control part 100 determines "No."

In Yes, controller control part 100 advances a process to Step S109.

In No, controller control part 100 returns a process to Step S101 and continues various process including the process of the host controller.

(Step S109)

If it proceeds to the standby mode, controller control part 100 as normal mode response data making part 101 performs standby mode transition process.

Controller control part 100 transmits standby mode transition command to standby response part 20 in this case (timing T102).

The details of standby mode transition process is described later.

Accordingly, the process of controller part 10 of normal mode process is ended.

(Step S209)

Again, the process of standby response part 20 is explained.

Here, standby reply control part 200 of standby response part 20 is standing by until controller part 10 proceeds to the standby mode.

Standby reply control part 200 of standby response part 20 as power supply control part 204 performs standby mode standby response start process when standby mode transition command is received.

Standby reply control part 200 starts the process in the standby mode for standby response part 20.

The details of standby mode standby response start process are also described later.

Then, standby reply control part 200 ends the process for standby response part 20 in the normal mode process.

As above-mentioned, normal mode process related to the embodiment in the present disclosure is completed.

Figure 7:
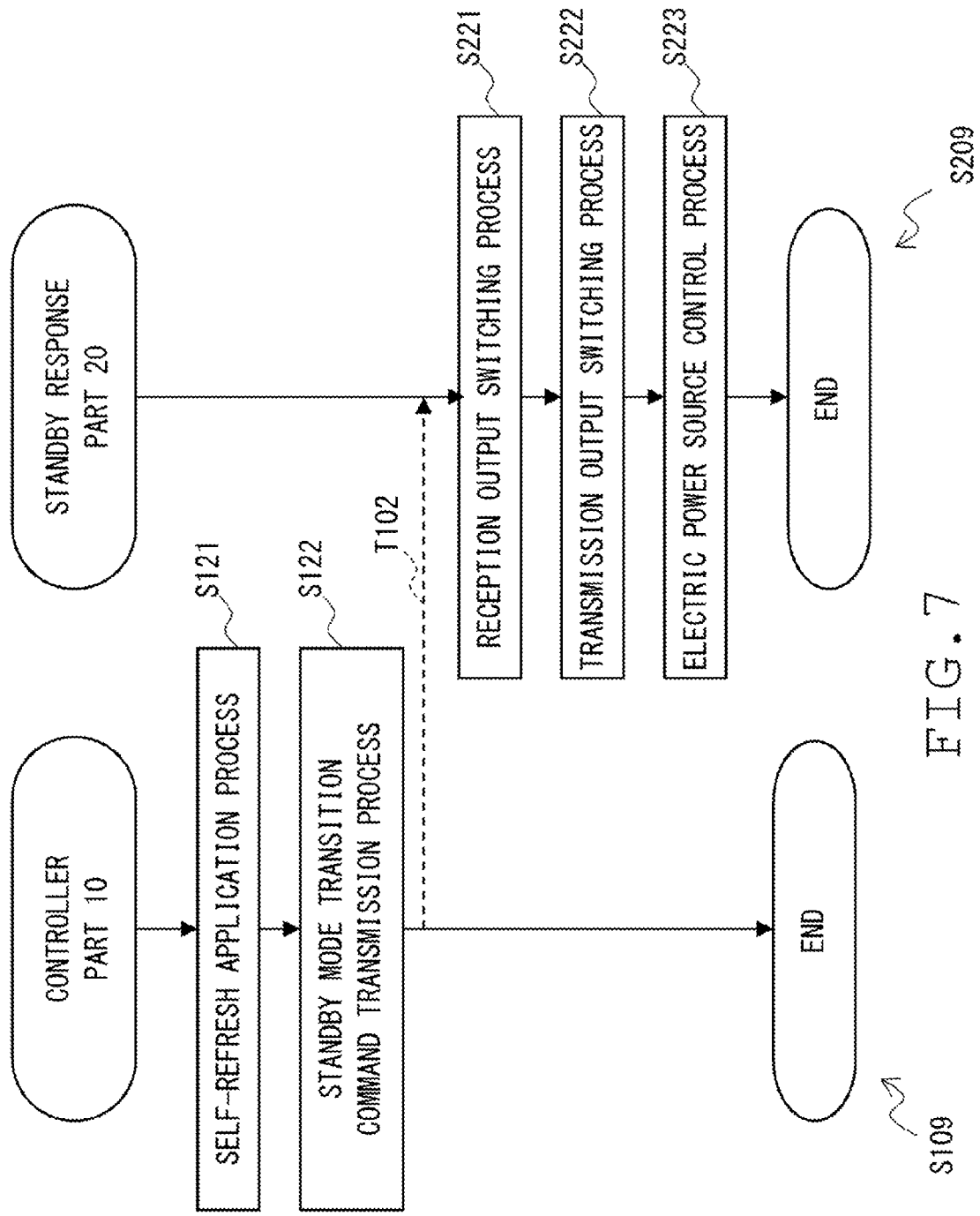
FIG. 7 is a flow chart of standby mode transition process and standby mode standby response start process in FIG. 4.

Then, as refer to FIG. 7, the details of standby mode transition process in Step S109 and standby mode standby response start process in Step S209 as shown in FIG. 4 are explained.

(Step S121)

Firstly, controller control part 100 of controller part 10 performs self-refresh application process.

Controller control part 100 stores various states or the like in non-volatile recording media of storage part 130, such as HDD or a flash memory. Also, when controller control part 100 does not access for a specified period, RAM of storage part 130 becomes in a state of self-refresh.

(Step S122)

Then, controller control part 100 performs standby mode transition command transmission process.

Controller control part 100 transmits standby mode transition command, which tells having proceeded to the standby mode, to standby reply control part 200 of standby response part 20 (timing T102).

As above-mentioned, standby mode transition process of controller part 10 is ended.

(Step S221)

Then, standby reply control part 200 of standby response part 20, which receives standby mode transition command, performs reception output switching process.

Standby reply control part 200 switches output of standby response input part 210 to the standby mode response data making part 201.

(Step S222)

Then, standby reply control part 200 performs transmission output switching process.

Standby reply control part 200 switches output of standby response output part 220 to both transmitting part 320 of communication interface part 30 and standby mode response data making part 201 of standby reply control part 200.

(Step S223)

Then, standby reply control part 200 performs electric power source control process.

Standby reply control part 200 controls power supply part 140 of controller part 10 and turns OFF electrical power application.

Standby reply control part 200 reads the control program for performing in the standby mode from HDD, a flash memory, or the like, to RAM in storage part 230 and performs start execution of standby mode process, which is explained later.

As above-mentioned, standby mode standby response start process of standby response part 20 is ended.

[Standby Mode Process by Responding Apparatus 1]

Figure 8:
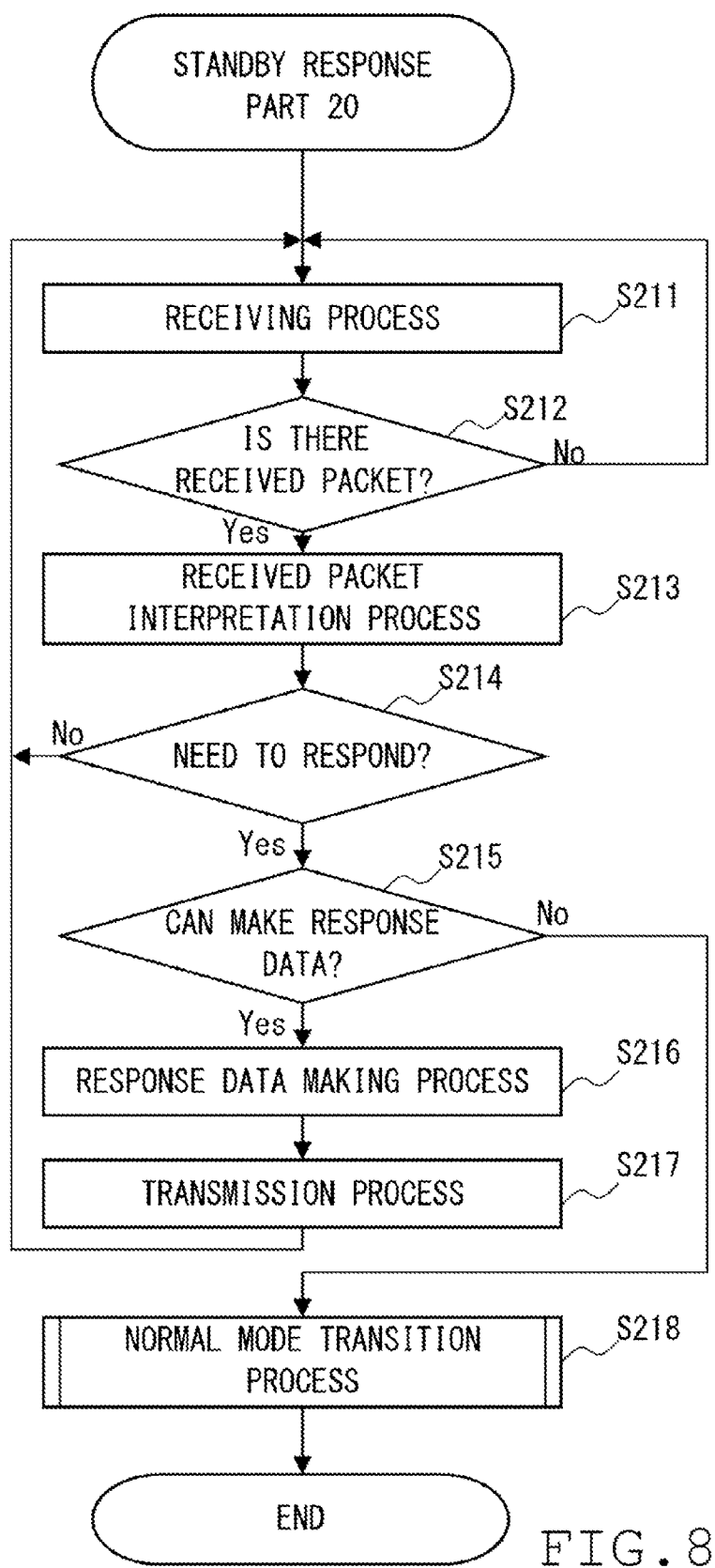
FIG. 8 is a flow chart of standby mode process of the responding apparatus.
Figure 9:
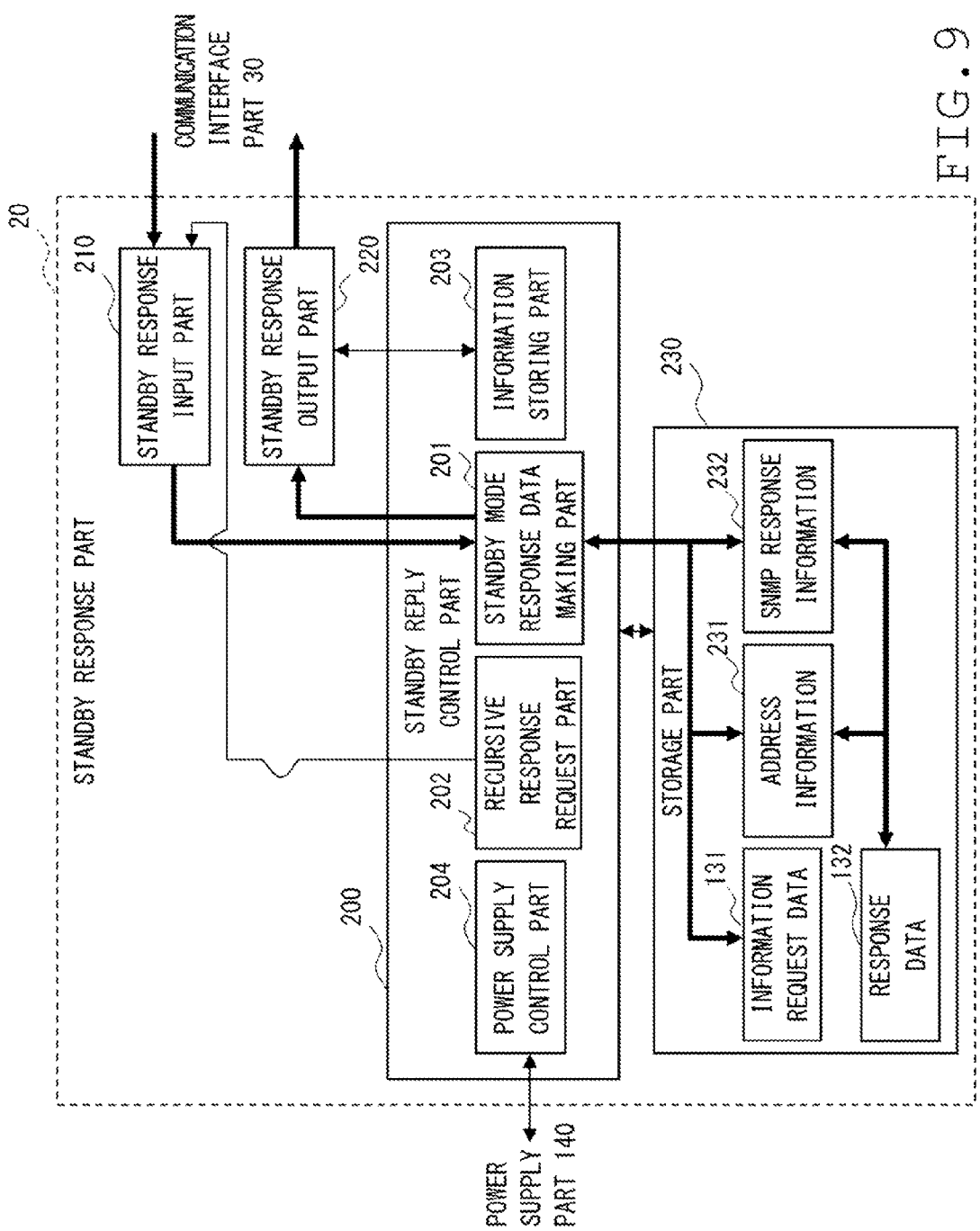
FIG. 9 is a schematic diagram of the response data creation process in FIG. 8.

Then, as refer to FIG. 8-FIG. 9, standby mode process by responding apparatus 1 related to the embodiment in the present disclosure is explained.

Standby mode process of the present embodiment responds by standby response part 20 making response data 132 at the time of standby mode. Standby response part 20 makes response data 132 by address information 231 and SNMP response information 232, which are memorized in storage part 230 by information storing part 203. In this case, if it is a packet that response is impossible, controller part 10 is restored to the normal mode and to be corresponded.

Standby reply control part 200 of standby response part 20 mainly performs the standby mode process of the present embodiment by executing the program memorized in storage part 230 with collaborating each part and by using hardware resources.

In the following, as refer to flow chart of FIG. 8, details of standby mode process are explained for every step.

(Step S211)

Firstly, standby reply control part 200 of standby response part 20 as standby mode response data making part 201 performs receiving process.

As refer to FIG. 9, at first, if a packet is received from network 5 in receiving part 310, the received packet is inputted into standby response input part 210. This inputted packet is further inputted into the standby mode response data making part 201 of standby reply control part 200.

(Step S212)

Then, standby reply control part 200 as standby mode response data making part 201 determines whether or not there is any received packet. Standby reply control part 200 determines "Yes," if there is a received packet. Otherwise, standby reply control part 200 determines "No."

In Yes, standby reply control part 200 advances a process to Step S213.

In No, standby reply control part 200 returns a process to Step S211, and it stands by until receiving a packet.

(Step S213)

If there is a received packet, standby reply control part 200 as standby mode response data making part 201 performs receive-packet interpretation process.

Standby reply control part 200 analyzes whether response is necessary or not by responding apparatus 1 by a protocol of the received packet, information of a transmission destination, or the like. Also, standby reply control part 200 analyzes whether standby response part 20 can be respond, controller part 10 is required to respond, or the like.

Also, if the received packet is information request data 131, standby reply control part 200 memorizes in storage part 230 temporarily.

(Step S214)

Then, standby reply control part 200 as standby mode response data making part 201 determines whether making response data 132 is needed or not. If it is a packet to be responded by responding apparatus 1, standby reply control part 200 determines "Yes." Otherwise, standby reply control part 200 determines "No."

In Yes, standby reply control part 200 advances a process to Step S215.

In No, standby reply control part 200 returns a process to Step S211 and continues reception of a packet.

(Step S215)

If it is a packet to be responded, standby reply control part 200 as standby mode response data making part 201 determines whether or not making of response data 132 is possible. Standby reply control part 200 reads storage part 230 and determines "Yes" if response data 132 can be made from address information 231 and SNMP response information 232. Standby reply control part 200 determines "No," if response data 132 cannot be made. As an example where response data 132 cannot be made, a case that the IP address and the MAC Address are not memorized in address information 231 is mentioned. Also, the case that the data of SNMP response information 232 is insufficient is enumerated as an example. Also, the case that the packet is neither ARP nor SNMP, or the like, is mentioned as an example.

In Yes, standby reply control part 200 advances a process to Step S216.

In No, standby reply control part 200 advances a process to Step S218.

(Step S216)

If making of response data 132 is possible, standby reply control part 200 as standby mode response data making part 201 performs response data making process.

According to FIG. 9, standby reply control part 200 generates the packet of response data 132 for a response as corresponded to the received packet based on the data stored in address information 231 and SNMP response information 232. Standby reply control part 200 stores the generated packet temporarily in storage part 230.

(Step S217)

Then, standby reply control part 200 as standby mode response data making part 201 performs transmission process.

Standby reply control part 200 outputs the packet to transmit as response data 132 inputted from the standby mode response data making part 201 to standby response output part 220 of communication interface part 30.

This packet to transmit is transmitted from transmitting part 320 to network 5.

(Step S218)

If it cannot make response data 132 regardless of being needed to respond, standby reply control part 200 as power supply control part 204 performs normal mode transition process.

Standby reply control part 200 restores controller part 10 in order to make response data 132.

The details of normal mode transition process is described later.

As above-mentioned, standby mode process of the present embodiment is completed.

Then, as refer to FIG. 10, it explains the details of normal mode transition process of Step S218 shown in FIG. 8.

(Step S231)

Firstly, standby reply control part 200 performs power turn ON process.

Standby reply control part 200 turns ON the power supply of controller part 10 via power supply control part 204.

(Step S232)

Then, standby reply control part 200 performs controller control-part restoration process.

Standby reply control part 200 resets controller control part 100.

Thereby, when controller control part 100 accesses storage part 130, self-refresh state or the like is canceled.

Controller control part 100 returns the various state or the like stored in the recording medium at Step S121 in FIG. 7.

(Step S233)

Then, standby reply control part 200 performs reception output switching process.

Standby reply control part 200 switches the output of standby response input part 210 from the standby mode response data making part 201 to controller input part 110 of controller part 10.

(Step S234)

Then, standby reply control part 200 performs transmission output switching process.

Standby reply control part 200 switches the output of standby response output part 220 from both transmitting part 320 of communication interface part 30 and information storing part 203 of standby reply control part 200 to transmitting part 320 and information storing part 203.

As above-mentioned, normal mode transition process is completed.

The following effects can be acquired with configuration as mentioned above.

A case of typical technology, there is a problem that it requires long time for transition from the normal mode to the standby mode.

On the other hand, responding apparatus 1 related to the embodiment of the present disclosure receives information request data 131 from network 5 in the normal mode and standby mode and can send response data 132 to network 5 as corresponded to information request data 131. Also, normal mode response data making part 101 that makes response data 132 in the normal mode is included. Also, recursive response request part 202 that transmits recursively information request data 131, which is for requiring information of other response data 132, to the normal mode response data making part 101 in the normal mode, is included. Also, information storing part 203 that accumulates the information of response data 132, which is made by normal mode response data making part 101 as corresponded to information request data 131 recursively transmitted by recursive response request part 202, as information request data 131 and response data 132 in storage part 230 in the normal mode is included. Also, standby mode response data making part 201 that makes response data 132 from the information accumulated by information storing part 203 in the standby mode is included. These are the characteristics.

As configured in this way, information for making response data 132 at the time of standby mode is accumulated at the time of normal mode. Also, response data 132 can be made from the accumulated information without transmitting the information accumulated at the time of standby mode. That is, the information for making response data 132 in the standby mode can be accumulated in storage part 230 at the time of normal mode. Therefore, in case of transition from the normal mode to the standby mode, it becomes unnecessary to transmit data from controller part 10 to standby response part 20 severally. Accordingly, the transition from the normal mode to the standby mode can be accelerated as compared with the typical case.

Also, a case of a typical image forming apparatus needs to transmit the data of RAM in main CPU to RAM of sub-CPU each time at the time of transition to the standby mode, and thus there is a problem of needing time until it proceeds to the standby mode.

The present disclosure is accomplished in view of such a situation, and it is making to cancel the above-mentioned problem.

According to the present disclosure, in the case of normal mode, information request data is made recursively, and the information of the response data made as corresponded to it is accumulated.

Thereby, because the accumulated response data is used at the time of standby mode, the responding apparatus that can perform transition to the standby mode at high speed can be provided.

Also, as responding apparatus 1 related to the embodiment in the present disclosure, transmission packet itself is acquired by the standby response part 20 at the time of normal mode, and information required for the response at the time of standby mode is extracted and memorized. Further, a network response is performed by using the information accumulated at the time of standby mode. That is, standby response part 20 of responding apparatus 1 in the present embodiment, normally, transmits the packet received from communication interface part 30 to controller part 10. Also, normally, standby response part 20 transmits the packet, which controller part 10 transmits, to communication interface part 30.

In that case, a transmission packet is checked and information required for the response at the time of standby is accumulated. Therefore, a specific setup for the response to standby response part 20 becomes unnecessary and it can expect reducing number of processes to develop controller parts 10.

According to responding apparatus 1 of the present embodiment, since standby response part 20 transmits a packet to controller part 10 recursively, response data 132 at the time of standby mode is collectable.

Thereby, the data for responding at the time of standby is automatically stored into standby response part 20.

Also, response data 132 at the time of standby mode can also be made in a short time. Therefore, after proceeding to the standby mode, a possibility that required response data 132 can be made from SNMP response information 232 is improved. Thus, a possibility that a case where response data 132 cannot be made at the time of the transition from the normal mode to the standby mode at the first time and controller part 10 must be restored immediately can be lower. In conclusion, reduction of power consumption is expected.

As for responding apparatus 1 related to the embodiment in the present disclosure, recursive response request part 202 is corresponded to information request data 131 from the outside, and in case that response data 132 that includes the specific kind of information, which is defined previously, by normal mode response data making part 101 is made, it requires the information of other response data 132.

By configuring in this way, when the IP address and MAC Address of responding apparatus 1 are confirmed, information request data 131 and response data 132 as a specific kind of information can be accumulated immediately, for example. Thereby, when the IP address of responding apparatus 1 is confirmed, it is possible to accumulate MIB for the response of SNMP in response data 132, immediately. Therefore, the frequency to which controller part 10 is restored from the standby mode can be reduced, and it can be improved power-saving efficiency.

Also, information request data 131 of responding apparatus 1 related to the embodiment in the present disclosure is data of a request of ARP or SNMP. Also, specific kind of information is an IP address and a MAC Address. Also, information request data 131 transmitted recursively is a GetNext request of SNMP.

Thereby, major information needed to be responded to a network at the time of standby mode can be accumulated. Accordingly, power-saving efficiency can be improved.

In addition, in the embodiment of the present disclosure, it is explained that one set of terminal 2, which SNMP manager or the like is installed, is connected to network 5, for example. However, as shown in FIG. 1, a plurality of terminal(s) 2 can be connected to network 5, and responding apparatus 1 can receive the packet of information request data 131 from a plurality of terminals 2.

Also, in the present embodiment, an example is explained that response data 132 as corresponded to ARP and SNMP is made as the information that information storing part 203 accumulates, for example. However, it is not limited to this. That is, if it is data replied as a response to information request, a variety of information can be accumulated.

As configured in this way, the response other than ARP or SNMP can be performed.

Also, the present embodiment shows an example that controller part 10 inputs information request data 131, which communication interface part 30 outputs in the normal mode, via standby response part 20. However, it is also possible that controller part 10 performs the direct input of the information request data 131 that communication interface part 30 outputs without using via standby response part 20.

As configuring in this way, processing burden of standby response part 20 at the time of normal mode can be reduced, and cost can be reduced.

Also, the above-mentioned embodiment shows storage part 130 and storage part 230 as separate components. However, it may configure that storage part 130 and storage part 230 uses the same recording medium, a shared memory, or the like. Even in this case, it may be exclusively accessed by controller control part 100 and standby reply control part 200 by using separate memory spaces.

As configuring in this way, cost of responding apparatus 1 can be reduced.

Also, the present disclosure is applicable to information processing apparatus other than image forming apparatus. Accordingly, it may be configured by using a server, a network scanner, and a server connected scanner separately with USB, or the like.

The components and operation of the above-mentioned embodiment are an example, and it cannot be overemphasized that it can change suitably and can perform in the range that does not deviate from the aim of the present disclosure.

Also, although the present disclosure is suitable for a responding apparatus, it is not limited to the responding apparatus and can be applied to the general apparatus that can operate in the standby mode, where transmits response data 132.

What is claimed is:

1. An image forming apparatus comprising:
   a communication interface part that receives information request data from a network and transmits response data for the information request data to the network, in a normal mode and in a standby mode, wherein the information request data includes a request of Address Resolution Protocol ('ARP') or Simple Network Management Protocol ('SNMP');
   a normal mode response data making part that makes the response data in the normal mode, wherein:
   if the information request data includes one of an ARP request and a Reverse Address Resolution Protocol ('RARP') request, the response data includes address information having one of an IP address and MAC Address for the image forming apparatus:
   if the information request data includes a SNMP request, the response data includes SNMP response information having one of a SNMP-Get response and a TRAP; and
   the SNMP response information includes items of Object Identifier ('OID') and data, the OID being an identifier that is attached and distinguishes an object of each management information stored in Management Information Base ('MIB') for SNMP, and the data including items of type and data value;
   a recursive response request part that recursively transmits information request data for requiring information of other response data to the normal mode response data making part in the normal mode, wherein:
   the recursive response request part requires the information of the other response data when the response data including a previously-defined specific kind of information is made by the normal mode response data making part as corresponded to the information request data from the network;
   the specific kind of information includes an IP address and a MAC Address; and
   the information request data recursively transmitted includes a GetNext request of SNMP;
   an information storing part that accumulates the information of the other response data made by the normal mode response data making part corresponding to the information request data recursively transmitted by the recursive response request part in the normal mode;
   a standby response part that:
   extracts information required for a standby mode response from the response data, wherein the information required for the standby mode response includes address information and the SNMP response information; and
   stores the information required for the standby mode response in memory included in the image forming apparatus;
   wherein, the recursive response request part: determines, if a notice of the address information being memorized is performed, whether or not there is a sufficient area to store the SNMP response information in the memory;
   the recursive transmission performed by recursive response request part occurs following a determination there is the sufficient area to memorize the SNMP response information in the memory, wherein the information request data includes a SNMP-GetNext request that requires the information of the other response data; and
   a standby mode response data making part that makes the response data in the standby mode from information accumulated by the information storing part.

2. A network responding method performed by an image forming apparatus that has a normal mode and a stand-by mode comprising:
   in the normal mode:
   receiving information request data from a network;
   making response data for the information request data,
   wherein, if the information request data includes one of an ARP request and an RARP request, the response data includes address information having one of an IP address and MAC Address for the image forming apparatus,
   wherein, if the information request data includes an SNMP request, the response data includes SNMP response information having one of a SNMP-Get response and a TRAP, and
   wherein the SNMP response information includes items of OID and data, the OID being an identifier that is attached and distinguishes an object of each management information stored in MIB for SNMP, and the data including items of type and data value;
   transmitting the response data for the information request data to the network;
   acquiring the response data that is transmitted;
   extracting information required for a standby mode response from the response data,
   wherein the information required for the standby mode response includes address information and the SNMP response information;
   storing the information required for the standby mode response in a non-transitory recording medium included in the image forming apparatus;
   determining, if a notice of the address information being memorized is performed, whether or not there is a sufficient area to store the SNMP response information in the non-transitory recording medium;
   transmitting recursively, if there is the sufficient area to memorize the SNMP response information in the non-transitory recording medium, the information request data including a SNMP-GetNext request that requires other information required for the standby mode response included in other response data; and
   storing the other information required for the standby mode response included in the other response data, and
   in the standby mode, making response data from the information required for the standby mode response stored in the non-transitory recording medium, and
transmitting to the network the response data made in the standby mode.

\* \* \* \* \*